(12) United States Patent
French (10) Patent No.: US 7,864,168 B2
(45) Date of Patent: Jan. 4, 2011

(54) VIRTUAL REALITY MOVEMENT SYSTEM

(75) Inventor: Barry J. French, Bay Village, OH (US)

(73) Assignee: Impulse Technology Ltd., Bay Village, OH (US)

( * ) Notice: Subject to any disclaimer, the term of this patent is extended or adjusted under 35 U.S.C. 154(b) by 1274 days.

(21) Appl. No.: 11/431,270

(22) Filed: May 10, 2006

(65) Prior Publication Data

US 2006/0287025 A1 Dec. 21, 2006

Related U.S. Application Data

(60) Provisional application No. 60/684,463, filed on May 25, 2005.

(51) Int. Cl.
*G09G 5/00* (2006.01)
(52) U.S. Cl. .................. 345/204; 345/205; 345/211; 345/213; 345/214
(58) Field of Classification Search .............. 345/156, 345/157, 161, 173, 184, 204, 205, 211, 213, 345/214, 419, 420, 474, 426; 463/1–7, 25–47; 709/204, 205, 226, 229
See application file for complete search history.

(56) References Cited

U.S. PATENT DOCUMENTS

| | | | |
|---|---|---|---|
| 4,162,792 A * | 7/1979 | Chang et al. ............. | 463/4 |
| 4,627,620 A | 12/1986 | Yang | |
| 4,645,458 A | 2/1987 | Williams | |
| 4,695,953 A | 9/1987 | Blair et al. | |
| 4,702,475 A | 10/1987 | Elstein et al. | |
| 4,709,917 A * | 12/1987 | Yang ..................... | 482/63 |
| 4,751,642 A | 6/1988 | Silva et al. | |
| 4,817,950 A | 4/1989 | Goo | |
| 4,925,189 A | 5/1990 | Braeunig | |
| 5,148,154 A | 9/1992 | MacKay et al. | |
| 5,229,756 A | 7/1993 | Kosugi et al. | |
| 5,239,463 A | 8/1993 | Blair et al. | |
| 5,288,078 A | 2/1994 | Capper et al. | |
| 5,320,538 A | 6/1994 | Baum | |
| 5,347,306 A | 9/1994 | Nitta | |
| 5,385,519 A | 1/1995 | Hsu et al. | |
| 5,405,152 A | 4/1995 | Katanics et al. | |
| 5,423,554 A | 6/1995 | Davis | |
| 5,469,740 A | 11/1995 | French et al. | |
| 5,495,576 A | 2/1996 | Ritchey | |
| 5,516,105 A | 5/1996 | Eisenbrey et al. | |
| 5,524,637 A | 6/1996 | Erickson | |
| 5,534,917 A | 7/1996 | MacDougall | |
| 5,577,981 A | 11/1996 | Jarvik | |
| 5,580,249 A | 12/1996 | Jacobsen et al. | |
| 5,597,309 A | 1/1997 | Riess | |
| 5,616,078 A | 4/1997 | Oh | |

(Continued)

FOREIGN PATENT DOCUMENTS

JP 07155463 A * 6/1995

*Primary Examiner*—Prabodh M Dharia
(74) *Attorney, Agent, or Firm*—Renner, Otto, Boisselle & Sklar, LLP (57) ABSTRACT

An interactive system tracks users in different physical spaces, both corresponding to a virtual space. The system resolves virtual collisions between the users in the virtual space. The system may resolve the virtual collision by examining the postures and power of the users. Different resolution criteria ("rules") may be used for same-posture and different postures collisions.

22 Claims, 7 Drawing Sheets

U.S. PATENT DOCUMENTS

| | | |
|---|---|---|
| 5,638,300 A | 6/1997 | Johnson |
| 5,641,288 A | 6/1997 | Zaenglein, Jr. |
| 5,704,837 A | 1/1998 | Iwasaki et al. |
| 5,715,834 A | 2/1998 | Bergamasco et al. |
| 5,885,156 A * | 3/1999 | Toyohara et al. ............... 463/1 |
| 5,913,727 A * | 6/1999 | Ahdoot ........................ 463/39 |
| 5,933,125 A | 8/1999 | Fernie et al. |
| 5,951,015 A * | 9/1999 | Smith et al. ................. 273/358 |
| 5,980,256 A | 11/1999 | Carmein |
| 5,989,157 A | 11/1999 | Walton |
| 6,066,075 A | 5/2000 | Poulton |
| 6,073,489 A | 6/2000 | French et al. |
| 6,077,201 A | 6/2000 | Cheng |
| 6,098,458 A | 8/2000 | French et al. |
| 6,100,896 A | 8/2000 | Strohecker et al. |
| 6,152,856 A | 11/2000 | Studor et al. |
| 6,155,924 A * | 12/2000 | Nakagawa et al. ............. 463/4 |
| 6,196,917 B1 * | 3/2001 | Mathias et al. ................. 463/2 |
| 6,256,040 B1 * | 7/2001 | Tanaka et al. ............... 345/421 |
| 6,308,565 B1 | 10/2001 | French et al. |
| 6,316,934 B1 | 11/2001 | Amorai-Moriya et al. |
| 6,400,996 B1 | 6/2002 | Hoffberg et al. |
| 6,430,997 B1 | 8/2002 | French et al. |
| 6,640,202 B1 | 10/2003 | Dietz et al. |
| 6,765,726 B2 | 7/2004 | French et al. |
| 6,850,252 B1 | 2/2005 | Hoffberg |
| 6,876,496 B2 | 4/2005 | French et al. |
| 7,082,570 B1 * | 7/2006 | von Wiegand et al. ...... 715/702 |
| 7,126,607 B2 * | 10/2006 | Emerson ..................... 345/474 |
| 7,335,134 B1 * | 2/2008 | LaVelle ........................ 482/1 |
| 7,336,276 B2 * | 2/2008 | Ishihata et al. .............. 345/426 |
| 2001/0041607 A1 * | 11/2001 | Adamczyk et al. ............. 463/2 |
| 2002/0090985 A1 * | 7/2002 | Tochner et al. ................. 463/1 |
| 2003/0058238 A1 | 3/2003 | Doak et al. |
| 2003/0077556 A1 * | 4/2003 | French et al. ............... 434/258 |
| 2003/0177187 A1 | 9/2003 | Levine et al. |
| 2004/0046800 A1 * | 3/2004 | Emerson ..................... 345/810 |
| 2004/0103146 A1 | 5/2004 | Park |
| 2004/0127272 A1 * | 7/2004 | Park et al. ...................... 463/6 |
| 2004/0166914 A1 * | 8/2004 | Ishihata et al. ................. 463/2 |
| 2004/0224740 A1 * | 11/2004 | Ball et al. ....................... 463/6 |
| 2004/0248632 A1 * | 12/2004 | French et al. ................... 463/4 |
| 2005/0179202 A1 * | 8/2005 | French et al. ............... 273/247 |
| 2006/0015923 A1 * | 1/2006 | Chuah et al. ................ 725/135 |
| 2006/0154726 A1 * | 7/2006 | Weston et al. ................ 463/37 |
| 2006/0209019 A1 * | 9/2006 | Hu .............................. 345/156 |
| 2006/0211462 A1 * | 9/2006 | French et al. ................... 463/1 |
| 2006/0258451 A1 * | 11/2006 | Yang ........................... 463/36 |
| 2007/0279392 A1 * | 12/2007 | Rosenberg et al. .......... 345/173 |
| 2008/0015024 A1 * | 1/2008 | Mullen ........................ 463/42 |
| 2008/0191864 A1 * | 8/2008 | Wolfson ..................... 340/524 |

* cited by examiner

VIRTUAL REALITY MOVEMENT SYSTEM

This application claims priority under 35 USC 119 of U.S. Provisional Application No. 60/684,463, filed May 25, 2005, which is incorporated by reference in its entirety.

BACKGROUND OF THE INVENTION

1. Field of the Invention

The invention relates to physical competition and assessment systems that involve whole-body movement in a physical area corresponding to movements in a virtual space.

2. Description of the Related Art

U.S. Pat. No. 6,876,496 describes a system for assessing movement and agility skills, which includes a wireless position tracker for continuously tracking and determining player position during movement in a defined physical space through player interaction with tasks displayed in a computer-generated, spatially translated virtual space for the quantification of the player's movement and agility skills based on time and distance traveled in the defined physical space. Multiple users, perhaps in different physical locations, may interact using some versions of the system.

However, to date, simulations and activities in virtual reality systems have suffered from the drawback of a lack of interesting and physically accurate interactions with objects in a virtual world. In particular, there has been a lack of systems that allow for interesting interaction with virtual objects by making large physical motions, such as sports-specific physical motions.

SUMMARY OF THE INVENTION

According to an aspect of the invention, an interactive system tracks users in different physical spaces, both corresponding to a virtual space. The system resolves virtual collisions between the users in the virtual space, in an manner that accurately models real world collisions. The system may resolve the virtual collision by examining the postures and power of the users. Different resolution criteria ("rules") may be used for same-posture and different postures situations.

According to another aspect of the invention, a method of multiuser physical competition includes tracking locations of multiple users in respective physical spaces, wherein the locations of the users in the physical spaces correspond to virtual locations in a virtual space, and resolving virtual collisions of the users in the virtual space.

According to still another aspect of the invention, a multiuser physical competition system includes: a first tracking system for determining changes in a first overall physical location of a first user within a first physical space; a second tracking system for determining changes in a second overall physical location of a second user within a second physical space; and at least one computer operatively coupled to the tracking systems for updating user virtual locations in a virtual space corresponding to the physical locations of the users, and for determining occurrence of virtual collisions of the users in the virtual space. The at least one computer resolves the virtual collisions in the virtual space.

According to yet another aspect of the invention, a method of multiuser physical competition includes the steps of: tracking a first overall physical location of a first user within a first physical space, wherein the first overall physical location corresponds to a first virtual location within a virtual space; at the same time, tracking a second overall physical location of a second user within a second physical space, wherein the second overall physical location corresponds to a second virtual location within the virtual space; determining occurrence of virtual collisions between the users within the virtual space; and for each of the virtual collisions, selecting a prevailing user.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the annexed drawings, which are not necessarily to scale.

DETAILED DESCRIPTION

A virtual reality physical assessment or physical competition system is configured to allow multiple users in different physical spaces to interact with one another in the same virtual space. The users may interact in a competition or assessment task that involves the possibility of collisions between the users in the virtual space. One or more computer systems track overall physical locations of the users within their respective physical spaces, and correspond these physical locations to virtual locations within the same virtual space. Results of virtual collisions within the virtual space are resolved by the systems as a function of the physical postures of the users, and/or of physical power of the users. Physical posture of the users may be inferred from a vertical location of a center of gravity or other tracked location point of each user. The user's posture may be categorized into one of a plurality of posture categories, based for example on a comparison of a present vertical location of a measurement point of the user and a previously-taken measurement point of the user when standing or in another predetermined position. Examples of such posture categories may include standing, jumping, and stooping or crouching. When the players have assumed different postures for the collision, the result of the collision (which player or user prevails in the collision) is determined by comparing the posture selected by the players or users. Each posture may have at least one other posture which it wins out over, and another posture which it loses in view of. For example, crouching or stooping may win out over standing, standing may win out over jumping, and jumping may win out over crouching or stooping. When both users select the same posture, the winner in the collision may be selected on the basis of which user has the greater power. The power may be determined, for example, by multiplying the weight of the user (entered before the start of the simulation), by the acceleration of the user (determined by examining the recent data on movement of the user's physical location). Thus the system's process for resolving collisions may take into account real-world attributes of both posture and power. The system may involve the users participating in a competition, such as a game. The loser in a collision between users may suffer penalty in such a competition, for example by being immobilized or by losing possession of a desirable object, such as a ball represented in the virtual space as being obtainable and movable by the users. In a further aspect of the invention, the simulation may involve static or movable virtual objects in the virtual space, which may be destroyed or overcome by a user or users, for example, by colliding with the objects with sufficient force. The system may be able to employ handicaps to allow players of different sizes and/or abilities to compete on a more even basis.

Figure 1:
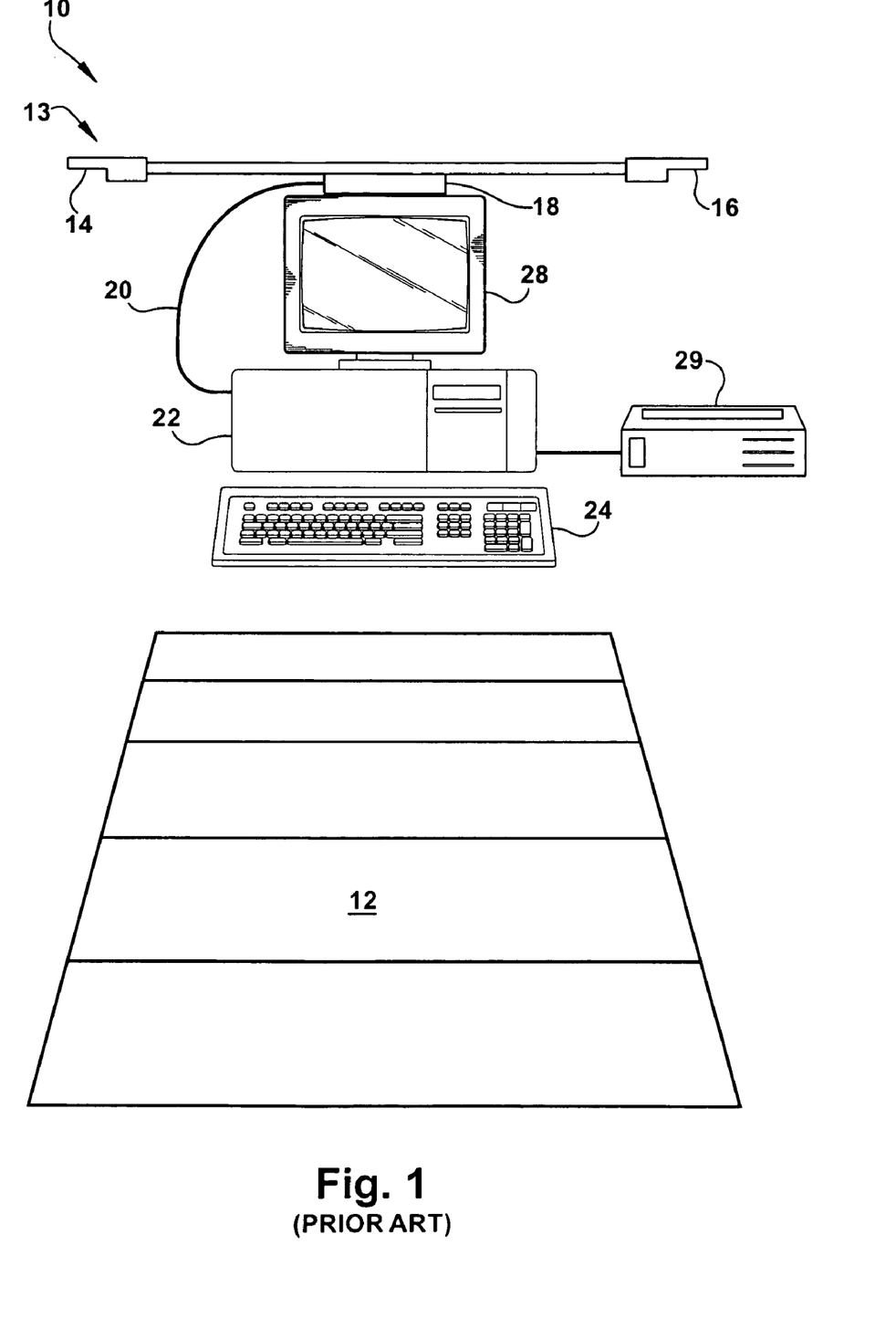
FIG. 1 is an oblique view of a prior art physical tracking and simulation system.
Figure 2:
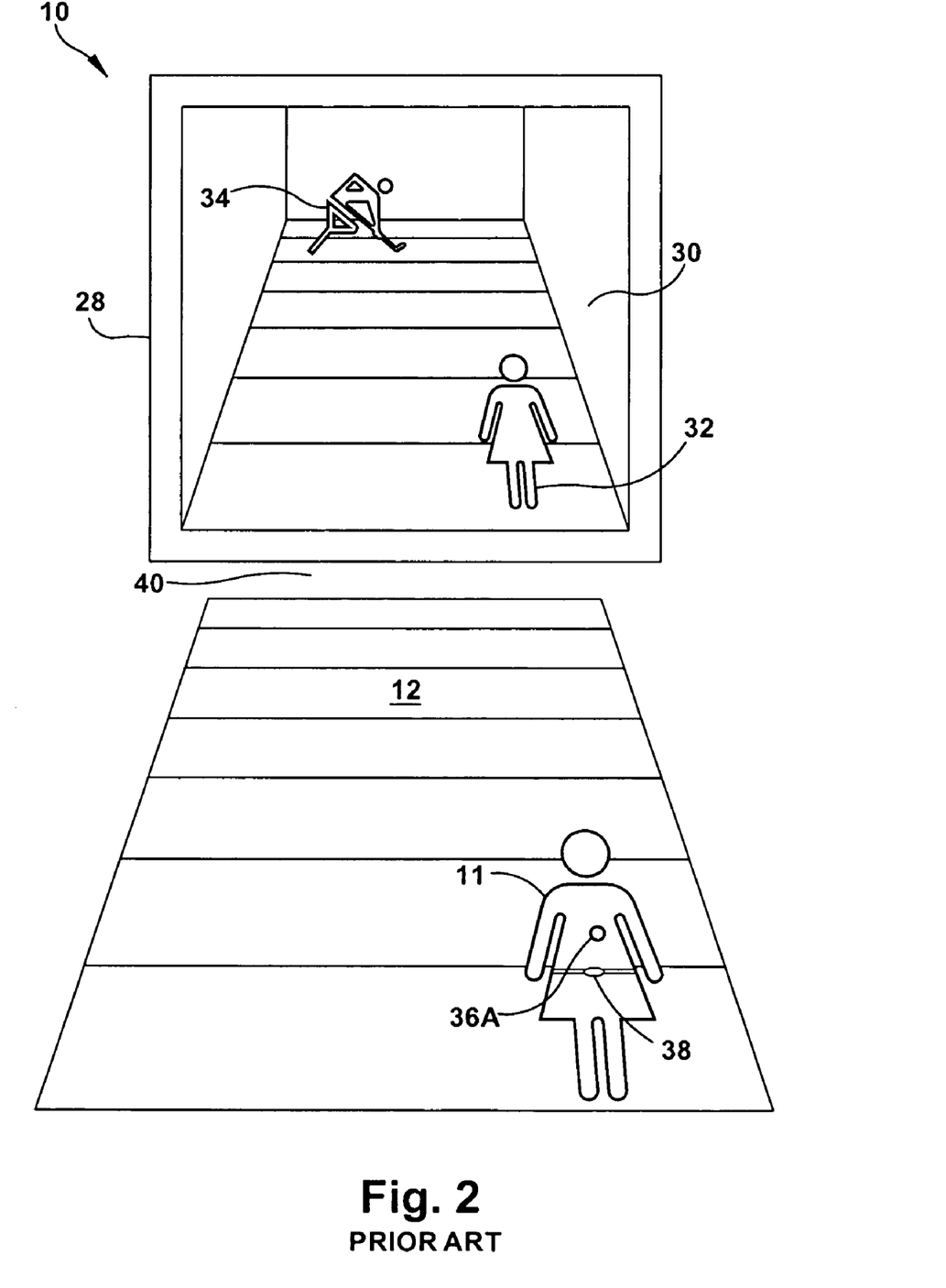
FIG. 2 is an oblique view showing a prior art view of virtual space on a display of the system of FIG. 1.

FIGS. 1 and 2 shows a prior art interactive tracking and feedback system 10 that is used as part of a multiplayer interactive system. The system 10 involves tracking the movements of a user 11 within a 3-dimensional physical space 12. The system 10 includes a wireless position tracking system 13 that has a pair of laterally spaced wireless optical sensors 14, 16 coupled to a processor 18. The processor 18 provides a data signal to a computer 22. The computer 22, under control of associated software, processes the data signal and provides a video signal to a large screen video monitor or video display 28. The computer 22 may be coupled to a data inputting device, such as a mouse, trackpad, keyboard, joystick, track ball, touch-sensitive video screen, or the like. The monitor 28 displays a computer-generated, defined virtual space 30 that may be a scaled translation of the defined physical space 12. The view of virtual space may be from a point of view in the virtual space corresponding to a location on a line directed outward from the display 28 into the physical space. The overall position of the user 11 in the physical space 12 is represented and correctly referenced in the virtual space 30 by a user icon 32. The overall position of the user will be understood as the position of the user's body as a whole, which may be the approximate position of the user's center of mass, or may be the position of some part of the user's body. The system 10 tracks the position of the user 11 within the defined physical space 12. By scaling translation to the virtual space 30, the user icon 32 is represented in a spatially correct position and can interact with one or more other icons 34 such that movement related to actual distance and time required by the user 11 (also known as a player, an athlete, or a subject) to travel in the physical space 12 can be quantified. The other icons 24 may have their movement controlled by another user or by a computer.

The defined physical space 12 may be any suitable available area, indoors or outdoors, of sufficient size. The optical sensors 14, 16 and processor 18 may be any of a variety of suitable, commercially-available tracking systems. The sensors may be a pair of optical sensors, i.e., trackers, mounted about 30 inches apart on a support mast centered laterally with respect to the defined physical space 12, to track movement in the desired physical space. The sensors 14, 16, operating in the near infrared frequency range, interact with a passive or active reflector or beacon 38 worn by the user 11. The reflector or beacon 38 (collectively herein referred to as a marker) is preferably located at or near the center of mass of the user 11 although it may be located elsewhere relative to the player. For example the reflector or beacon may be attached to a belt that is worn about the waist of the player. The sensors report positions of the reflector or beacon 38 in three dimensions relative to a fiducial mark midway between the sensors. The fiducial mark is the origin of the default coordinate system. A suitable tracking system is the TRAZER system available from CYBEX International, Inc. Other types of suitable tracking systems may alternatively be used. Examples of other types of suitable tracking systems include magnetic systems, ultrasonic systems, and video-based systems, such as chroma-key systems and other image-tracking systems.

The user 11 may also wear other devices, such as a heart monitor 36A. Also, the user 11 may also have beacons or other markers to track other body parts.

Further details for tracking and display systems may be found in U.S. Pat. Nos. 6,073,489, 6,098,458, 6,430,997, 6,765,726, and 6,876,496, the entire disclosures of which are incorporated herewith in their entireties. By tracking position, a wide variety of measures may be made that involve quantifying the change of position of the user 11. These include measures of speed (or velocity), acceleration, quickness, agility, energy expended (work), dynamic posture, power, the user's ability to maximize spatial differences over time between the user and a virtual protagonist, a time in compliance, the user's ability to rapidly change direction of movement, dynamic reaction time, cutting ability, phase lag time, first step quickness, jumping or bounding ability, cardio-respiratory status, and sports posture. Further details regarding these measures may be found in the previously-mentioned patents.

Figure 3:
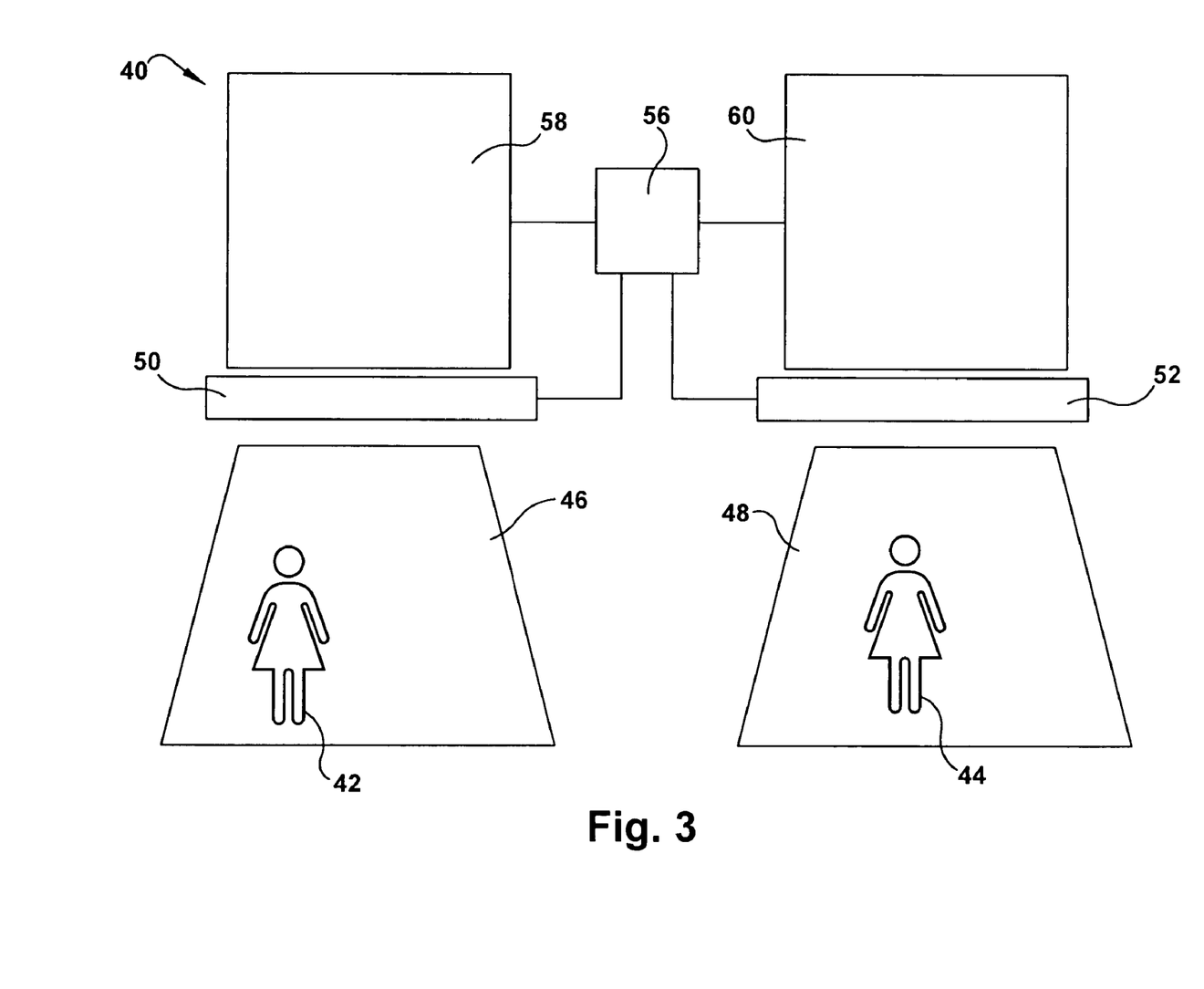
FIG. 3 is an oblique view showing use of multiple of the systems of FIG. 1 coupled together to form a multiplayer system used in the present invention.

As FIG. 3 shows, multiple of the systems 10 may be combined together into a multi-user system 40 in which multiple users 42 and 44 participate simultaneously in separate respective physical spaces 46 and 48. The reference numbers 42 and 44 are used herein to refer to the virtual counterparts of the users 42 and 44 and their icons, which are also referred to as the users 42 and 44. The physical spaces 46 and 48 may be located in the same room, in which case it may be possible to have one tracking system track the position of both of the users. However, it may be more effective to have separate tracking systems for each of the physical spaces. This is shown in the illustrated embodiment, with tracking systems 50 and 52 corresponding to respective physical spaces 46 and 48. It will be appreciated that separate tracking systems will generally be needed if the physical spaces 46 and 48 are in different locations, such as in different rooms or in different buildings.

The tracking systems 50 and 52 are operatively coupled to a computer 56 (which may consist of two or more separate computer units in communication with one another and/or with a central computer unit). The computer 56 in turn is operatively coupled to displays 58 and 60 that correspond to the physical spaces 46 and 48, respectively. The operative coupling between the computer 56, and the tracking systems 50 and 52 and the displays 58 and 60 may be accomplished by means of hard-wired cables between these components. Alternatively, it will be appreciated that the operative coupling may employ other means such as modems and telephone lines, radio or infrared light signals, or connections to computer networks such as the World Wide Web. Thus such connections may be made over long distances, allowing players separated by a large physical distance to participate in a simulation in the same virtual space. It will be appreciated that more than one computer or processor may be used, especially with systems connected over large distances.

The displays 58 and 60 may show different views of the virtual space, for example oriented toward different starting points of the users 42 and 44 within their respective physical spaces. Alternatively, the displays 58 and 60 may show the same view of virtual space, such as the same third person perspective.

It will be appreciated that more than two users may be involved in the same simulation, with additional physical spaces, displays, tracking systems, and/or computers added as appropriate. For example, each player may have certain individual components of the system 10 (a display, tracking system, and physical space), while all the users share a computer or computers. It will be appreciated that even when more than one physical space is used, more than one user may occupy each physical space.

Many of the aspects of the multi-user system 40 shown in FIG. 3 are described in the aforementioned patents. However, the multi-user system 40 is configured to incorporate virtual collisions in the virtual space between the users 42 and 44. The system 40 may detect a collision in the virtual space by determining when the virtual locations corresponding to the physical locations of the two users 42 and 44 are within a predetermined amount of each other. Once a virtual collision between the users 42 and 44 is determined to have occurred, the computer 56 resolves which of the users 42 and 44 prevails in the virtual collision, as described below.

One aspect that has not been addressed in prior systems is accurate simulation for handling virtual collisions within the virtual space. In real life, the result of such collisions, for instance attempted tackling in American football, is a function of many factors, including the weight, movement speeds, and postures of the colliding parties. All other things being equal, a larger and faster person will come out the better in a collision with a lighter, smaller person. However, posture is an important aspect in the outcome of the collision. A smaller person may be able to tackle, stop, or restrain a larger person by aiming low, hitting the larger person around the legs and feet. Countermeasures, such as jumping or hurdling, may be used to overcome an attempted low tackle or hit. Thus both posture and power (the latter being a function of mass and acceleration or velocity, for instance being mass times acceleration or velocity) are factors that may determine the outcome of a collision.

For purposes of the simulation, the posture of a user may be determined based on the relative height of the center of gravity of the user 11 (FIG. 2). The phrase "relative height," as used herein, refers to a height of the sensor 38 of the user 11 relative to some reference height. The reference height may be a user-specific height, such as the height of the sensor when the user is standing up straight. Alternatively, the reference height may be some other suitable height or combination of heights, for example being based on both a user's standing and jumping heights. The relative height may be expressed as a percentage of the reference height, or as a difference from the reference height.

Figure 4:
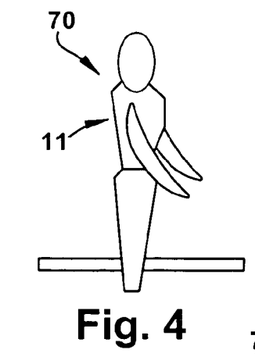
FIG. 4 is a schematic illustration of a user in a standing posture.
Figure 5:
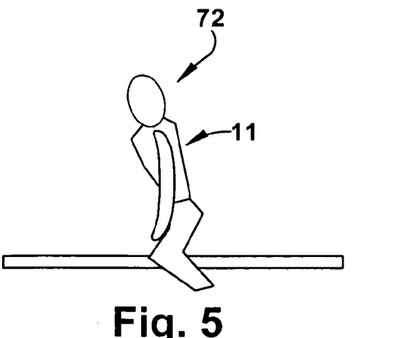
FIG. 5 is a schematic illustration of a user in a crouching or stooping posture.
Figure 6:
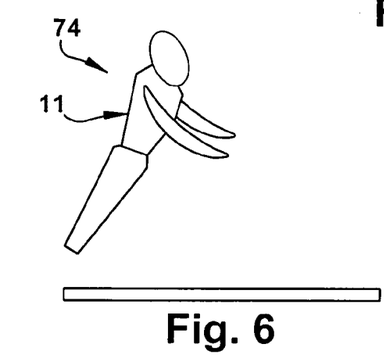
FIG. 6 is a schematic illustration of a user in a jumping posture.

Posture in the virtual space may a function of the reference height, and may involve categorizing the posture into one of a number of categories, based on relative height. Examples of categories are shown in FIGS. 4-6, wherein FIG. 4 shows a standing posture 70, FIG. 5 shows a stooping or crouching posture 72, and FIG. 6 shows a jumping posture 74. To give one example of how categories for the postures may be determined, the user may be in a standing posture if his or her relative height is 60% to 130% of the reference (standing) height. Users having a relative height below that may be categorized as crouching or stooping, and users with a relative height above that range may be characterized as jumping. It will be appreciated that other criteria may be employed for categorizing posture, and that a greater number of different categories for postures may be employed. Views of virtual space provided on the displays 28, 58, and 60 may employ visual indicators, such as use of different sorts of icons to indicate the different postures.

Figure 7:
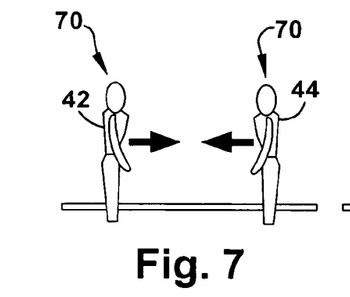
FIGS. 7-9 illustrate a virtual collision and its result for two users that are both in a standing posture.
Figure 8:
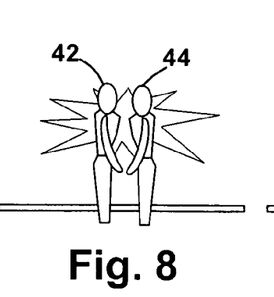
Figure 9:
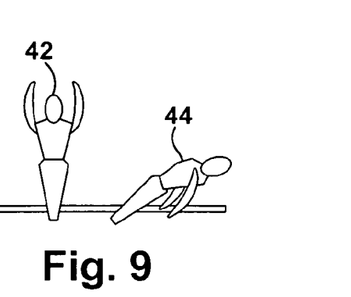

FIGS. 7-9 indicate the process of resolving a collision when both of the users 42 and 44 have the same standing posture 70. The users may be considered having the same posture when both of them fall into the same posture category, such as one of the categories shown in FIGS. 4-6, and described above. Alternatively, the determination that both users have the same posture for purposes of collision resolution may be made by directly comparing the relative heights of the users. Relative heights that are sufficiently close to one another may be considered to place the users in the same posture, regardless of where the users may fall in terms of posture categories. As illustrated in FIGS. 7-9, determination of the power of each of the two users 42 and 44 is made (FIG. 7) immediately before a collision in virtual space (FIG. 8). As indicated above, the power may be simply the product of the user's mass (which may be entered in prior to beginning use of the system) and the user's acceleration (determined from the tracked movement of the user immediately prior to collision). It will be appreciated that an assumed mass may be used when a mass is not entered by a user. It will further be appreciated that relative velocities and/or accelerations may be compared directly, under the assumption that the users have the same mass.

As shown in FIG. 9, the results of the collision may be graphically displayed in the views shown on the various displays 28, 58, and 60. For example, the user 44 losing in the collision may be indicated as knocked down or lying flat. In addition, the user who does not prevail in the collision may be penalized in terms of some competitive disadvantage, for example, losing game points, not being able to move for a certain period of time, or losing control of some object in the virtual space, such as a ball or flag. The collision-resolving procedure may realistically involve both size and acceleration, and may aid in training a user to selectively increase acceleration.

Figure 10:
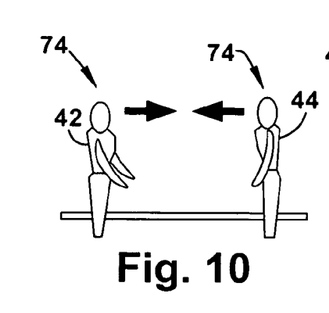
FIGS. 10-12 illustrate a virtual collision and its result for two users that are both in a jumping posture.
Figure 11:
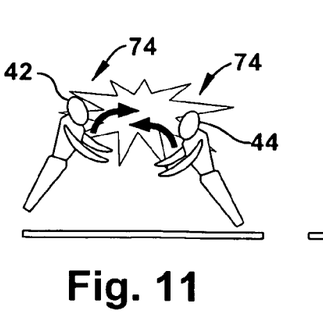
Figure 12:
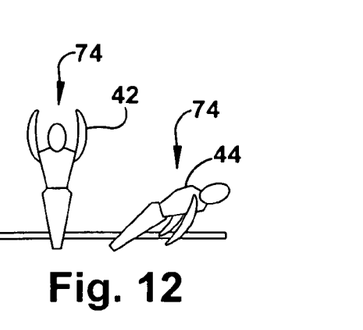

The power-comparison process illustrated in FIGS. 7-9 may also be employed in other situations where both of the users 42 and 44 have the same posture (both crouching or stooping, or both jumping). FIGS. 10-12 show the users 42 and 44 in a collision with both in a jumping posture 74.

Figure 13:
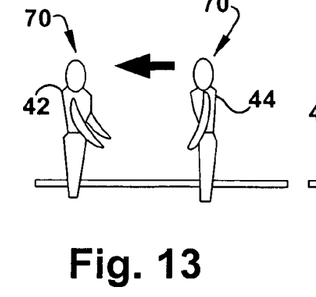
FIGS. 13-15 illustrate a virtual collision and its results for two users, one of which is in a standing posture, and the other of which is in a stooping or crouching posture.
Figure 14:
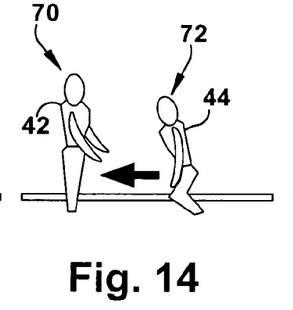
Figure 15:
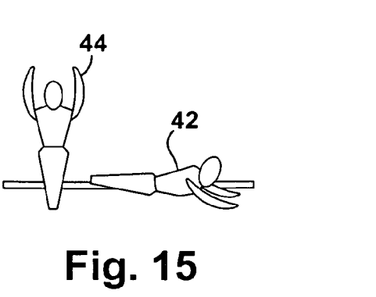

FIGS. 13-15 illustrate the collision process for a collision where one of the users 42 is in a standing posture 70, and the other user 44 is in the crouching or stooping posture 72. The determination, that this difference in posture between the two users 42 and 44 exists, may be made either by directly comparing the relative heights of the users, or by first categorizing the relative heights into posture categories, and then comparing the posture categories for the two users. As indicated in FIG. 15, the user 44 in the stooping or crouching posture prevails in the collision, regardless of the power of either of the users. It will be appreciated that alternatively posture difference and power may both be involved in determining which of the users 42 and 44 prevails in the collision.

Figure 16:
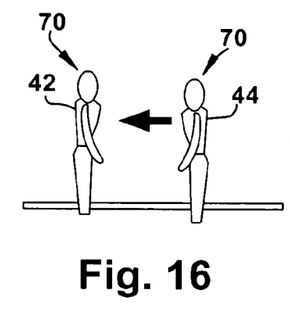
FIGS. 16-18 illustrate a virtual collision and its results for two users, one of which is in a jumping posture, and the other of which is in a standing posture.
Figure 17:
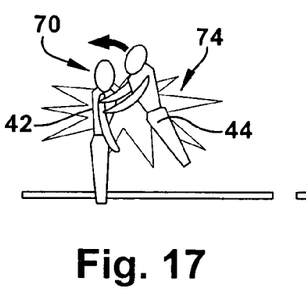
Figure 18:
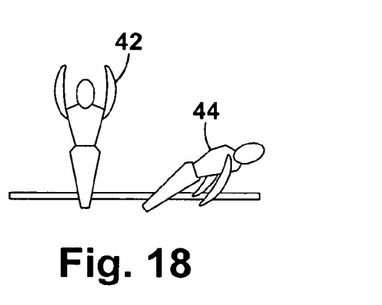

FIGS. 16-18 illustrate resolution of another different-posture situation, with one of the users 42 in a standing posture 70, and the other of the users 44 in a jumping posture 74. In such a situation, the standing user 42 may prevail in the collisions, regardless of the relative power of the two users 42 and 44.

Figures 19, 20, 21:
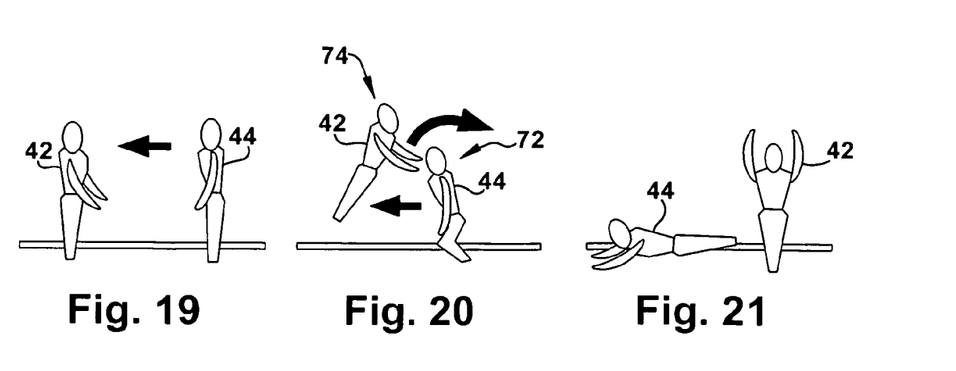
FIGS. 19-21 illustrate a virtual collision and its results for two users, one in a jumping posture, and the other in a crouching or stooping posture.

An additional different-posture situation is illustrated in FIGS. 19-21, where one of the users 42 has a jumping posture 74, and the other user 44 is in a stooping or crouching posture 72. In such a circumstance, the jumping user 42 is considered to prevail in the "collision," jumping, hurdling, or vaulting over the crouching or stooping user.

Thus it will be appreciated that for the three categories of posture (standing, jumping, and stooping or crouching), each category defeats one of the other different postures, and loses out to another of the different postures. This creates a strategic situation where the users select posture with a desire to outwit their opponent, either a human opponent or a computer opponent. In addition, different users may be able to provide different sorts of power in different postures, such as sports-specific postures for various sports, adding to the depth of the strategic situations available. The ability to measure power in various different postures, which may be sports-specific postures, provides a significant advantage in analyzing physical performance of a user. The information obtained by measuring power in different postures may be advantageously utilized by a coach, physical therapist, clinician, or athlete to evaluate and/or improve physical performance.

A further wrinkle is provided when different icons are used to represent different postures of the users in views of the virtual space. This allows the users 42 and 44 to make selections and changes in posture and strategy based on postures presently assumed by an opposing user. This allows for an additional layer of strategy based on quick reactions, and possible decoy postures taken shortly prior to a virtual collision. It will be appreciated that facing strategic choices that correspond to actual experience makes for a rewarding simulation.

It will be appreciated that the performance of the two users may be scaled or handicapped if desired. For example, a multiplier may be applied to one or more of the users in order to increase or decrease that user's power. This may allow opponents of different sizes and/or skills to competitively compete against one another.

In determining the handicap for a user, the user may be evaluated during the performance of suitable sample tasks. For example, the user's power may be measured as the user is instructed to impact a virtual object as hard as he or she is able to.

Figure 22:
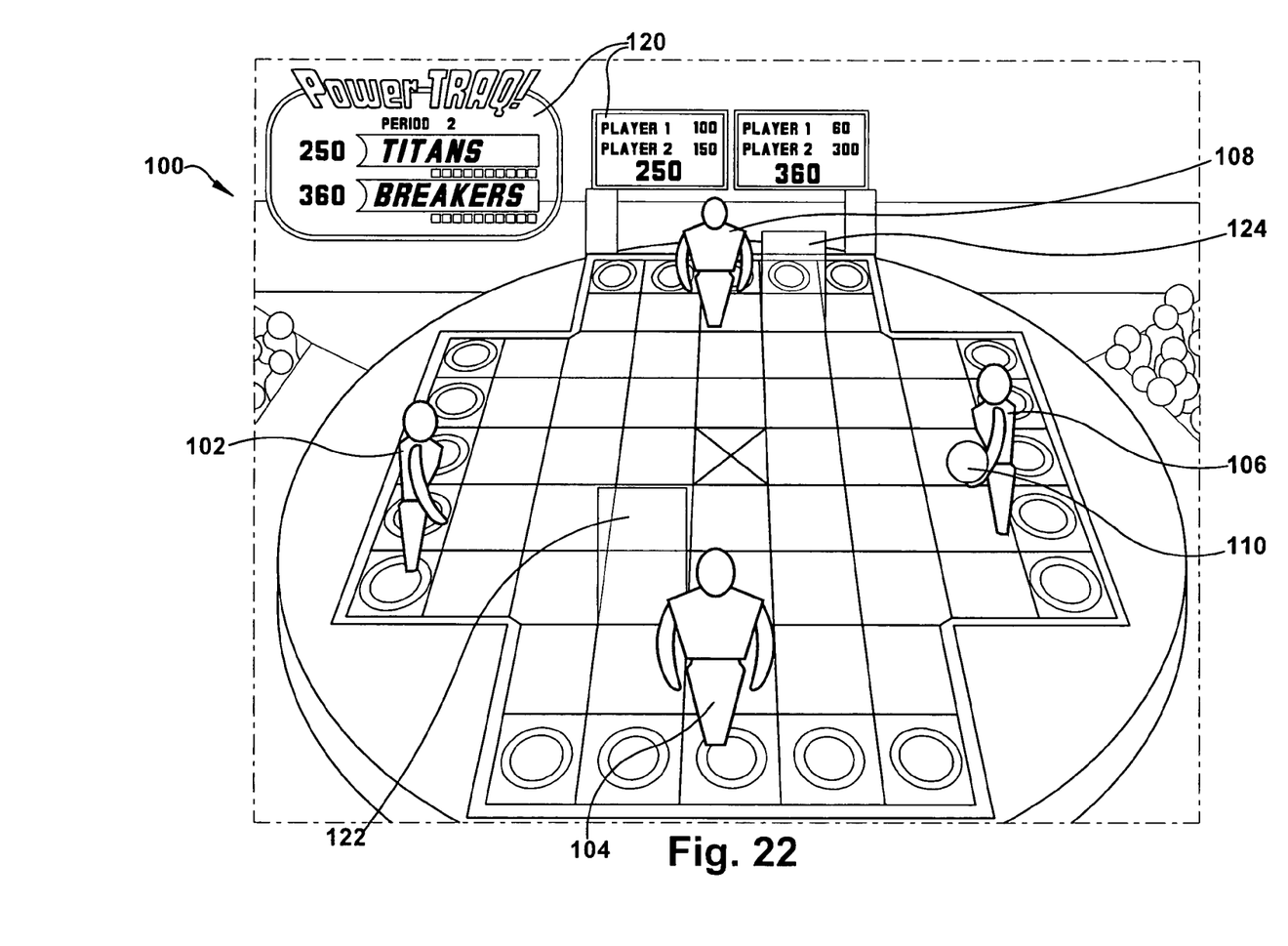
FIG. 22 is an oblique view illustrating a view of virtual space that may be displayed on the display of the present system, for one specific competition or game.

FIG. 22 shows a view 100 of virtual space of one simulated competition that may be performed using a multiplayer system, such as that described above. The simulation involves two teams each having two users. Icons 102 and 104 represent the users for one team, and icons 106 and 108 represent the users for the other team. The icons 102-108 are also described herein as referring to their corresponding users. The goal of the competition is to advance an orb 110 into one of the home areas of the other team. Players may transfer the orb 110 back and forth by coming into contact with one another. Players may block one another from certain areas by positioning themselves in front of players of the other team. In addition, virtual collisions between players may be used to slow down or temporarily incapacitate players on the other team, and/or to gain possession of the orb 110. The simulation play may involve players touching certain locations, designated as "charge points," in certain areas of their team's home areas, in order to activate their ability to prevail in collisions with players of the other team. This increases game strategy and provides a motivation for the users to vigorously move during the simulation. Game or simulation play may involve a goal of moving the orb 110 to the charge points of an opposing team, and thereby removing those charge points from the virtual world.

The virtual view may include one or more scoreboards 120 for providing an indication of scoring or other status of the simulation. The virtual playing field may include virtual obstacles 122 and 124, which may limit movement of the users 102-108, and may thereby increase complexity and strategy in the competition.

Figure 23:
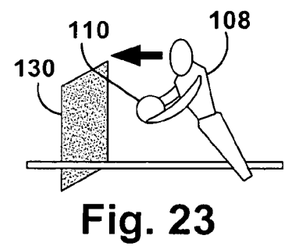
FIGS. 23-25 illustrate a collision and its aftermath for a failed attempt to break through a virtual object.
Figure 24:
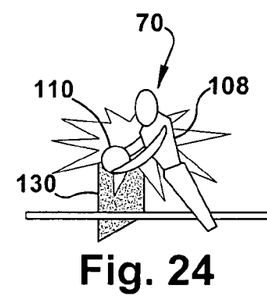
Figure 25:
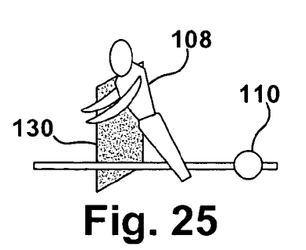
Figure 26:
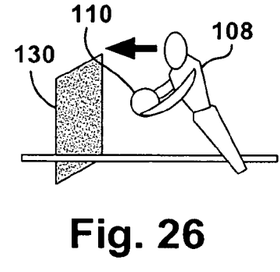
FIGS. 26-28 illustrate a collision and its aftermath showing a successful breakthrough of a virtual object.
Figure 27:
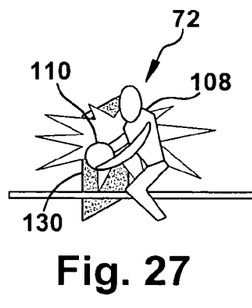
Figure 28:
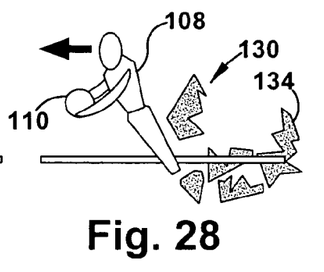

Referring now in addition to FIGS. 23-28, the obstacles or shields 122 and 124 may be breakable if colliding with, with sufficient power. FIGS. 23-25 illustrate an unsuccessful attempt by a user 108 in a standing posture 70 to move through, destroy, or neutralize an obstacle 130, while FIGS. 26-28 illustrate a successful attempt. If the user 108 does not have sufficient power, and/or does not have the right posture, the obstacle 130 may remain in place after the collision, with the user 108 perhaps suffering a penalty. For example, an unsuccessful attempt to destroy or move though an obstacle may cause the user 108 to lose possession of the orb 110, as illustrated in FIG. 25. Alternatively, other penalties may involve loss of mobility for a specified period of time.

If the user 108 makes contact with the virtual obstacle 130 with sufficient power and/or in the correct posture, the obstacle 130 may be configured to yield either temporarily or permanently. FIG. 28 shows permanent destruction of the obstacle 130 following a successful collision by the user 108 in a crouching or stooping posture 72. This may be represented visually by showing broken pieces 134 of the object 130. It will be appreciated that many variations are possible with regard to the obstacles, including requiring one level of minimum power to move through an obstacle, and another level to permanently destroy the obstacle. Also, different levels of power may be required for different postures, and/or certain postures (i.e., jumping) may be required to navigate past an obstacle.

The competition described above creates an opportunity for learning collaborative skills and sports-specific skills. Performance information that may be delivered to users includes heart rate (provided by heart monitors on the users), calories burned, impact power, and points scored.

It will be appreciated that systems described herein take the concept of virtual simulation with whole-body movements to new levels, allowing enhanced options involving resolution of virtual collisions in virtual space. Such revisions may teach a variety of skills, including sports-specific skills, collaborative skills, as well as increased awareness of body movement.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A multiuser physical competition system comprising:
a first tracking system for determining changes in a first overall physical location of a first user within a first physical space;
a second tracking system for determining changes in a second overall physical location of a second user within a second physical space; and
at least one computer operatively coupled to the tracking systems for updating user virtual locations in a virtual space that correspond in a scaled translation to the physical locations of the users, and for determining occurrence of virtual collisions of the users in the virtual space;
wherein the at least one computer resolves the virtual collisions in the virtual space;
wherein the at least one computer resolves the virtual collisions by selecting a prevailing user for each of the virtual collisions; and
wherein the at least one computer resolves the virtual collisions by determining whether the users are considered as having the same posture or as having different postures, and by applying a same-posture resolution criterion if the users have the same posture, or applying a different-posture resolution criterion if the users have different postures.

2. The system of claim 1 wherein the at least one computer provides a relative benefit to the prevailing user, thereby also providing a relative detriment to the non-prevailing user.

3. The system of claim 1, wherein the at least one computer determines whether the users are considered as having the same posture by comparing relative overall physical location heights of the users.

4. The system of claim 1, wherein the at least one computer determines whether the users are considered as having the same posture by categorizing postures of the users based on overall physical location heights of the users into one of a plurality of posture categories.

5. The system of claim 4, wherein the at least one computer applies the different-posture resolution criterion such that each of the posture categories is at an advantage to at least one of the other posture categories, and such that each of the posture categories is at a disadvantage to at least another of the other posture categories.

6. The system of claim 1, wherein the at least one computer applies the same-posture criterion by comparing respective powers of the users, wherein the power is based both on movement and mass of the user.

7. A multiuser physical competition system comprising:
a first tracking system for determining changes in a first overall physical location of a first user within a first physical space;
a second tracking system for determining changes in a second overall physical location of a second user within a second physical space; and
at least one computer operatively coupled to the tracking systems for updating user virtual locations in a virtual space that correspond in a scaled translation to the physical locations of the users, and for determining occurrence of virtual collisions of the users in the virtual space;
wherein the at least one computer resolves the virtual collisions in the virtual space;
wherein the at least one computer resolves the virtual collisions by selecting a prevailing user for each of the virtual collisions; and
wherein the at least one computer resolves the virtual collisions in the virtual space by comparing respective powers of the users, wherein the power is based both on movement and mass of the user.

8. The system of claim 7, wherein the at least one computer selects the prevailing user by applying different criteria for same-posture collisions and for different-posture collisions.

9. The system of claim 7, further comprising at least one display, wherein the at least one display is operatively coupled to the at least one computer to provide at least one view of the virtual space to at least one of the users.

10. The system of claim 9, wherein the at least one view includes one or more icons that provide an indication of posture of at least one of the users.

11. A method of multiuser physical competition comprising:
tracking a first overall physical location of a first user within a first physical space, wherein the first overall physical location corresponds in a scaled translation to a first virtual location within a virtual space;
at the same time, tracking a second overall physical location of a second user within a second physical space, wherein the second overall physical location corresponds in a scaled translation to a second virtual location within the virtual space;
determining occurrence of virtual collisions between the users within the virtual space; and
for each of the virtual collisions, selecting a prevailing user;
wherein the selecting is based at least on posture of the users, and movement of the users prior to the virtual collision.

12. A method of multiuser physical competition comprising:
tracking a first overall physical location of a first user within a first physical space, wherein the first overall physical location corresponds in a scaled translation to a first virtual location within a virtual space;
at the same time, tracking a second overall physical location of a second user within a second physical space, wherein the second overall physical location corresponds in a scaled translation to a second virtual location within the virtual space;
determining occurrence of virtual collisions between the users within the virtual space; and
for each of the virtual collisions, selecting a prevailing user;
wherein the selecting the prevailing user includes determining whether the users are in a same-posture relation to each other, or in a different-posture relation to each other.

13. The method of claim 12, wherein the selecting further includes:
if the users are in the same-posture relation to each other, applying a same-posture resolution criterion, wherein the same-posture resolution criterion includes comparing powers of the users at the time of the virtual collision; and if the users are in the different-posture relation to each other, applying a different-posture resolution criterion, wherein the different-posture resolution criterion provides at least an advantage based on the postures of the users.

14. The method of claim 13, wherein the determining includes comparing relative overall physical location heights of the users.

15. The method of claim 14, wherein the determining includes categorizing postures of the users based on overall physical location heights of the users into one of a plurality of posture categories.

16. The method of claim 15, wherein the different-posture resolution criterion specifies that each of the posture categories is at an advantage to at least one of the other posture categories, and that each of the posture categories is at a disadvantage to at least another of the other posture categories.

17. The method of claim 12 further comprising, during the tracking, displaying at least one view of the virtual space to at least one of the users.

18. The method of claim 17, wherein the displaying includes displaying one or more icons that provide an indication of posture of at least one of the users.

19. A method of multiuser physical competition comprising:

tracking a first overall physical location of a first user within a first physical space, wherein the first overall physical location corresponds in a scaled translation to a first virtual location within a virtual space;

at the same time, tracking a second overall physical location of a second user within a second physical space, wherein the second overall physical location corresponds in a scaled translation to a second virtual location within the virtual space;

determining occurrence of virtual collisions between the users within the virtual space; and for each of the virtual collisions, selecting a prevailing user;

wherein the selecting includes:
  comparing powers of the users at the time of the virtual collision; and
  selecting the prevailing user as the user with the greater power.

20. A physical activity system comprising:

a tracking system for determining changes in an overall physical location of a user within a first physical space;

at least one computer operatively coupled to the tracking systems for updating a user virtual location in a virtual space corresponding in a scaled translation to the physical location of the user, and for determining occurrence of virtual collisions in the virtual space between the user and one or more virtual objects;

wherein the at least one computer resolves the virtual collisions in the virtual space based on at least a posture of the user and a power of the user.

21. The system of claim 20, wherein the at least one computer determines the posture of the user using an overall physical location height of the user.

22. The system of claim 20, wherein the power is based both on movement and mass of the user.

* * * * *